United States Patent
Hess et al.

(10) Patent No.: US 8,340,908 B2
(45) Date of Patent: Dec. 25, 2012

(54) CALIBRATION OF TRACKING DEVICE

(75) Inventors: Wolfgang Hess, Karlsbad (DE); Tobias Münch, Straubenhardt (DE); Hans-Jürgen Nitzpon, Ettlingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1357 days.

(21) Appl. No.: 11/972,466

(22) Filed: Jan. 10, 2008

(65) Prior Publication Data

US 2008/0167805 A1    Jul. 10, 2008

(30) Foreign Application Priority Data

Jan. 10, 2007    (EP) .................................... 07000467

(51) Int. Cl.
*G01C 19/00*    (2006.01)
*G01C 25/00*    (2006.01)
*G01C 21/20*    (2006.01)

(52) U.S. Cl. .......... 701/519; 701/505; 702/94; 702/104; 702/151

(58) Field of Classification Search .................... 702/87, 702/92, 94, 85, 104, 150, 151, 159; 348/115, 348/118, 169; 701/501, 505, 508, 519; 345/157, 345/158, 156, 162; 600/595, 587; 73/1.75, 73/1.77; 356/139.04
See application file for complete search history.

(56) References Cited

U.S. PATENT DOCUMENTS

| | | | |
|---|---|---|---|
| 4,209,255 A | 6/1980 | Heynau et al. | |
| 4,700,301 A | 10/1987 | Dyke | |
| 5,767,524 A * | 6/1998 | Barbier et al. | 250/559.29 |
| 5,854,843 A * | 12/1998 | Jacknin et al. | 381/309 |
| 5,936,722 A * | 8/1999 | Armstrong et al. | 356/139.03 |
| 6,162,191 A * | 12/2000 | Foxlin | 600/595 |
| 6,618,683 B1 | 9/2003 | Berstis et al. | |
| 7,385,684 B2 * | 6/2008 | Young et al. | 356/139.05 |
| 7,405,726 B2 * | 7/2008 | Pelosi | 345/158 |
| 2004/0135069 A1 * | 7/2004 | Odell | 250/208.2 |
| 2005/0251294 A1 * | 11/2005 | Cerwin | 700/279 |
| 2008/0048931 A1 * | 2/2008 | Ben-Ari | 345/8 |
| 2008/0073484 A1 * | 3/2008 | Kane | 250/201.1 |

FOREIGN PATENT DOCUMENTS

| | | |
|---|---|---|
| WO | WO 00/52563 | 9/2000 |
| WO | WO 01/07995 | 2/2001 |

* cited by examiner

*Primary Examiner* — Christine Behncke
(74) *Attorney, Agent, or Firm* — O'Shea Getz P.C.

(57) ABSTRACT

A tracking device may be used to detect a position or movement of an object. The tracking device may include a housing that supports an emitter. The emitter may transmit a first signal. A measurement device within the housing may measure rotational movement of an object. Circuitry may receive a second signal in response to the first signal. The circuitry may reset an angle value to a predetermined value based on the second signal. The angle value may be determined by a measurement of the rotational movement of the object.

24 Claims, 8 Drawing Sheets

CALIBRATION OF TRACKING DEVICE

PRIORITY CLAIM

This application claims the benefit of priority from European Patent Application No. 07000467.6 filed on Jan. 10, 2007, which is incorporated by reference.

BACKGROUND OF THE INVENTION

1. Technical Field

This invention relates to tracking systems, and more particularly, to components for calibrating a tracking device.

2. Related Art

Tracking systems may be used to capture motion. Information about location and orientation may be transmitted to a computer that enables the person to interact with a virtual environment. Virtual acoustics may ensure optimal localization and sound color reproduction. Some tracking systems may utilize line of sight methods to track motion. However, obstacles and ambient radiation may severely deteriorate performance of these devices. Some systems may utilize drift compensators to overcome interference, but the additional compensators may increase cost and may not be accurate. Therefore, there is a need for a tracking device and/or system that may efficiently reduce or compensate for drift.

SUMMARY

A tracking device may be used to detect a position or movement of an object. The tracking device may include a housing that supports an emitter. The emitter may transmit a first signal. A measurement device within the housing may measure rotational movement of an object. Circuitry may receive a second signal in response to the first signal. The circuitry may reset an angle value to a predetermined value based on the second signal. The angle value may be determined by a measurement of the rotational movement of the object.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The features and methods may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
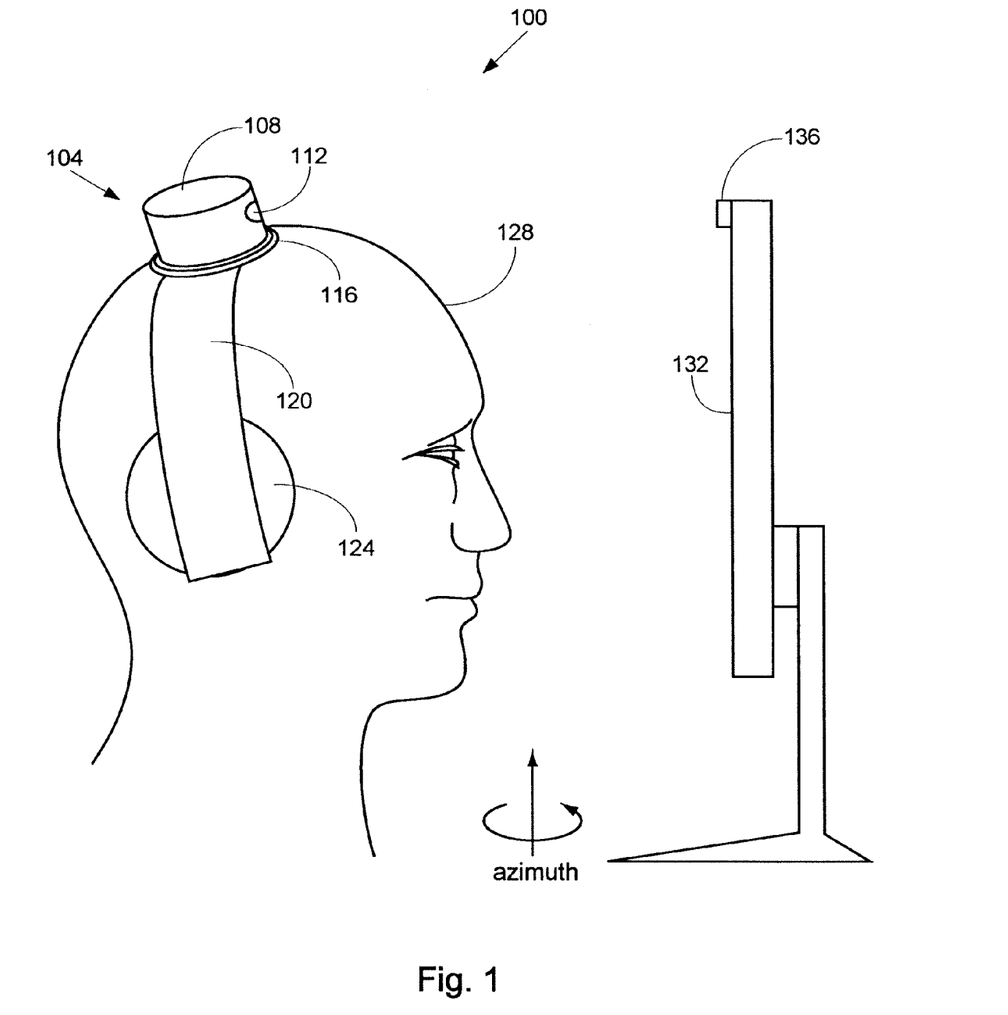
FIG. 1 is a front view of a tracking system.

FIG. 1 is a front view of a tracking system 100. The tracking system 100 may be an optical, radio frequency ("RF"), mechanical, and/or electrical tracking system used to track movement of an object 128. The system may track head or body movement. The detected motion or movement may be used in an entertainment, audio, and/or visual system to enhance performance or create a virtual experience. Alternatively, the object 128 may be an inanimate object or device, such as a tool used for computer games, entertainment systems, or other audio or visual systems.

The tracking system 100 may include a tracking device 104 and a receiving device 136 that may be part of or coupled to a device 132. The tracking device 104 may couple the object 128. In some systems, the tracking device 104 may be an inertial head tracking device. Alternatively, the tracking device 104 may be an optical or RF tracking device. The tracking device 104 may be a headphone or part of a headphone device that delivers audio and communicates with an entertainment and/or electrical system. In other systems, the tracking device 104 may be a visual device or part of a visual device that may block sight (e.g., an ability to see) or may be a device or part of a device that a user can speak in to. The tracking device 104 may be a pointer device.

The tracking device 104 may measure translation and/or rotational movements (e.g., six degrees of freedom) of the object 128. The measurement of rotational movement may include measurement of rotational angles, such as roll, pitch, and/or yaw angles. In some systems, the tracking device 104 may measure the rotation or turning of a head. The roll may correspond to movement of the head towards a shoulder. The pitch may correspond to an angle corresponding to a nod of the head. The yaw may correspond to horizontal turning of the head, which may also be referred to as an azimuth or azimuthal angle. The tracking device 104 may also measure lateral or translation movement that may be substantially vertical or horizontal in orientation.

In some systems, the tracking device 104 may include a housing 108, a window 112, a base 116, a band 120, and a device 124. The device 124 may be an ear covering of a headphone, a speaker, or other device that outputs sound or audible signals.

The housing 108 may be a container or enclosure that may house mechanical and/or electrical components for measuring movement of the object 128 and/or for calibration of the tracking device 104. In some systems, the housing 108 may attach to the band 120 via the base 116. The base 116 and the band 120 may also be considered part of the housing 108. The housing 108 may be the entire mechanical frame that is supported by the object 128.

Figure 2:
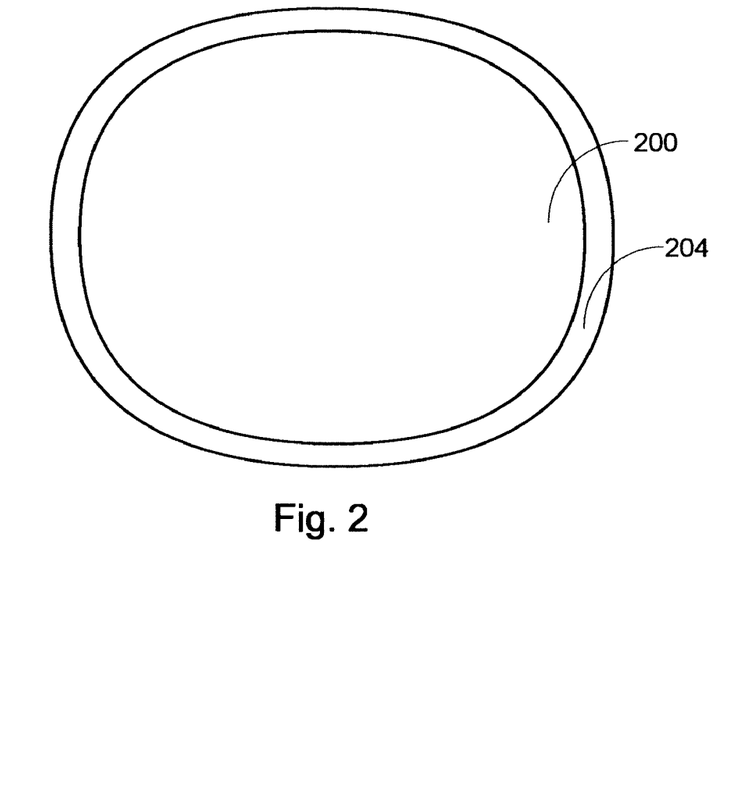
FIG. 2 is a top view of a component of a tracking device.

FIG. 2 is a top view of a housing 200. In some systems, the housing 200 has a substantially round or cylindrical shape. The housing 200 may be conductive and/or non-conductive material that allows light or electrical signals to pass there through.

The housing 200 may rest on or attach to a base 204. The base 204 may extend beyond the perimeter of the housing 200 or may have a similar or smaller diameter than the housing 200. The base 204 may be a unitary part of the housing 200 or may be part of a band or component that may be placed on the object 128, such as the band 120. The housing 200 may be configured to attach to or be removed from the band or supporting component. Alternatively, the housing 200 may be an integral part of the band or the supporting component.

Figure 3:
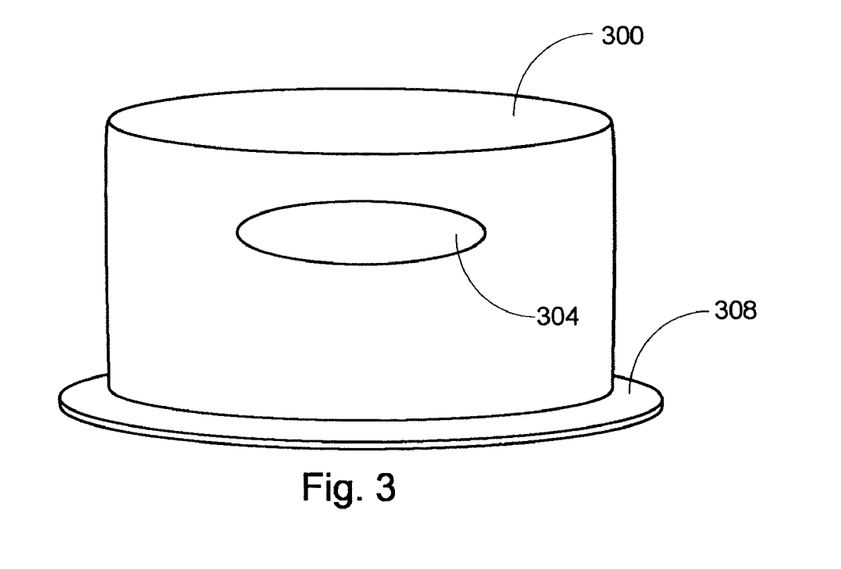
FIG. 3 is a side view of a component of a tracking device.

FIG. 3 is a side view of a housing 300. A base 308 may couple the housing 300 to a supporting component, such as the band 120. In some devices, the housing 300 may have an opening that admits light or air passing through (e.g., a pass way 304). The pass way 304 may be located in other areas of the housing 300, such as the top of the housing 300 or pass through an area covering both a portion of the top and side of the housing 300. The pass way 304 may be made of glass, plastic, air, or any material that may allow for transmission or reception of a signal, such as an infrared ("IR"), optical, electromagnetic, and/or RF signal. In some devices, the pass way 304 may be part of an emitter and/or receiver circuitry or may be an emitter or receiver component.

Figure 4:
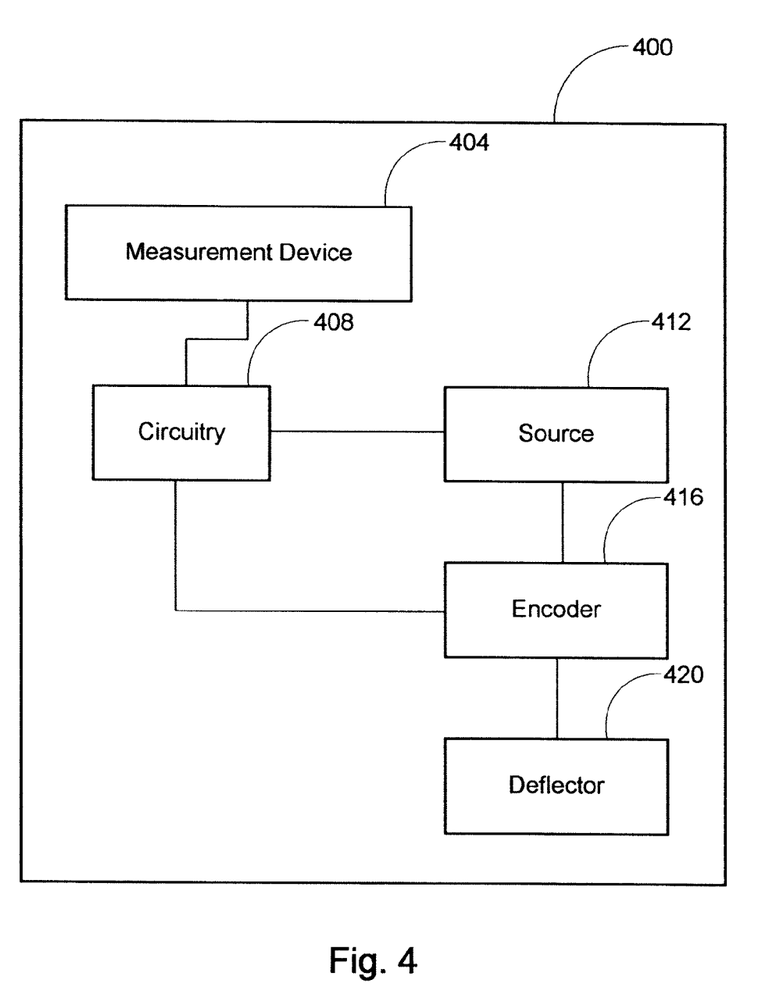
FIG. 4 is a block diagram of components of a tracking device.

FIG. 4 shows components of a tracking device 400. The tracking device 400 may include a measurement device 404, circuitry 408, a source 412, an encoder 416, and a deflector 420. Each of these components may be enclosed within a housing, as 108, 200, or 300. Alternatively, the source 412, the encoder 416, and/or the deflector 420 may be located remote from the other components but be supported by the object 128.

The measurement device 404 may comprise an inertial measuring device and may be located within a housing 108, 200, or 300. In some devices, the measurement device 404 may be one or more gyroscopes. The gyroscopes may use a spinning rotor mounted to a gimbal. When the housing of the gimbal and rotor changes direction, the rotor may change orientation. Changing a spin axis may require a torque proportional to the rate of change, and such torque may be measured on an axis of the gimbal, which may be used for angular velocity readings or measurements.

A spin gyroscope may be utilized. A spin gyroscope may generate a position signal rather than a rate signal. A spin gyroscope may include a spinning wheel mounted on a three axis gimbal. When an outer housing rotates, a gimbal may swivel to allow the wheel to continue spinning on a same axis. Angular encoders may measure rotations of a gimbal, which correspond to the orientation of the housing with respect to the spin axis. One spin gyroscope may measure two rotational degrees of freedom. In some devices, two spin gyroscopes may be used. One may measure pitch and roll (which may be referred to as a vertical gyroscope) and another may measure yaw (which may be referred to as a directional gyroscope).

In some devices, the measurement device 404 may be a magneto-optical gyroscope or fiber-optic gyroscope that may send a light signal in two directions around a spool of fiber-optic material and may detect a phase difference when the light signal converges on itself. Alternatively, the measurement device 404 may be an optical or RF device or other devices, such as a sensor, configured to measure movement or rotation of an object, such as the object 128.

The circuitry 408 may be in communication with the measurement device 404. The circuitry 408 may include one or more hardware or hardware/software components. The circuitry 408 may comprise one or more processors that may access a computer-readable medium that may store computer-readable program code (e.g., software or firmware) executable by the (micro)processor, logic gates, switches, an application specific integrated circuit (ASIC), a programmable logic controller, and/or an embedded microcontroller, for example. The circuitry 408 may include one or more memories. A memory may be a non-volatile and/or volatile memory, such as a Random Access Memory "RAM," a Read-Only Memory "ROM," or an Erasable Programmable Read-Only Memory (EPROM or Flash memory). In some devices, the memory may be remote from the circuitry.

The circuitry 408 may communicate with the measurement device 404. In some devices, the measurement device 404 may transmit measurement data to the circuitry 408. The measurement data may include a digital and/or analog signal, data packets, bits, flags, or key sequences corresponding to measurement of a movement of an object, such as the object 128. The circuitry 408 may receive unprocessed measurement data and may generate data used in the tracking system, such as an angle value. The angle value may include an azimuth or azimuthal angle value. The angle value may include a roll or pitch angle value. The circuitry 408 may reset the angle value to a predetermined value. In some devices, the circuitry 408 may reset the angle value to zero or substantially zero when the tracking device is aligned in a predetermined position (e.g., when the tracking device or the supporting object faces a receiving device, such as the receiving device 136).

Alternatively, the measurement device 404 may measure or estimate an angle value and transmit it to the circuitry 408. In an alternate system, separate circuits may process or generate the angle value or other data corresponding to the tracking system. The circuitry may be part of or remote from the tracking device 400.

The circuitry 408 may receive a signal, such as a feedback signal or a response signal, from a receiving device, such as the receiving device 136. The circuitry may include wireless circuitry, such as an optical or RF sensor. Alternatively, other circuitry may be used to receive the feedback or response signal.

A source 412 may communicate with the circuitry 408 or separate circuitry. The source 412 may include an emitter, a light emitting diode ("LED"), and/or another device that transmits a signal, such as an IR (infrared), ultraviolet, or RF (radio frequency) signal. In some devices, the source 412 may be an IR emitter that transmits an infrared spectrum or beam. The beam may be processed by the encoder 416 to minimize interference. The encoder 416 may be a rotating wheel, gear, or other device that breaks a steady beam or signal. Alternatively, the encoder 416 may be part of the source 412 or the circuitry 408 and may digitally encode the beam or signal. Any other encoding techniques may be utilized.

The source signal may be deflected by the deflector 420 in a vertical angular range of substantially about 45 degrees. In FIG. 4, the deflector 420 receives the signals processed by the encoder 416. However, the signal from the source 412 may be encoded before deflection or may be encoded after deflection.

Figure 5:
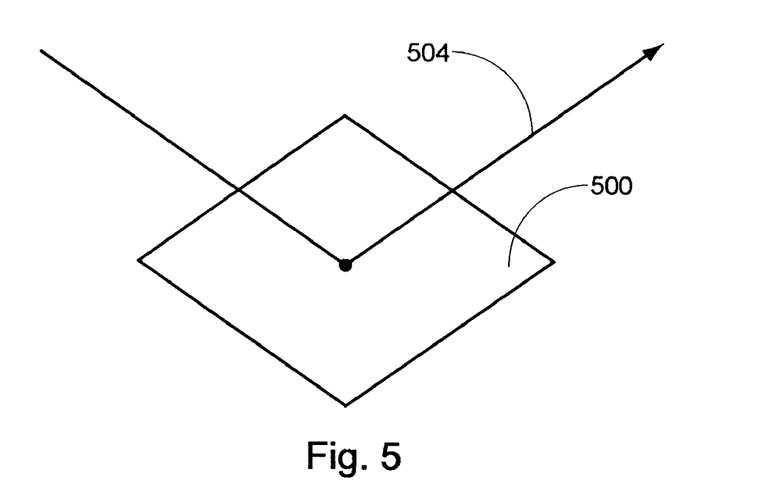
FIG. 5 is a component of a tracking device.

FIG. 5 is an exemplary deflector 500. The deflector 500 may be arranged in a fixed position to disperse a collimated beam or may move or rotate. In some devices, the deflector 500 may be a fan-like deflector or have a substantially fan shape. The deflector 500 may deflect a signal 504, such as an IR beam or signal, in a vertical angular range of substantially about 45 degrees. The angular range may cover any angle within 360 degrees.

Figure 6:
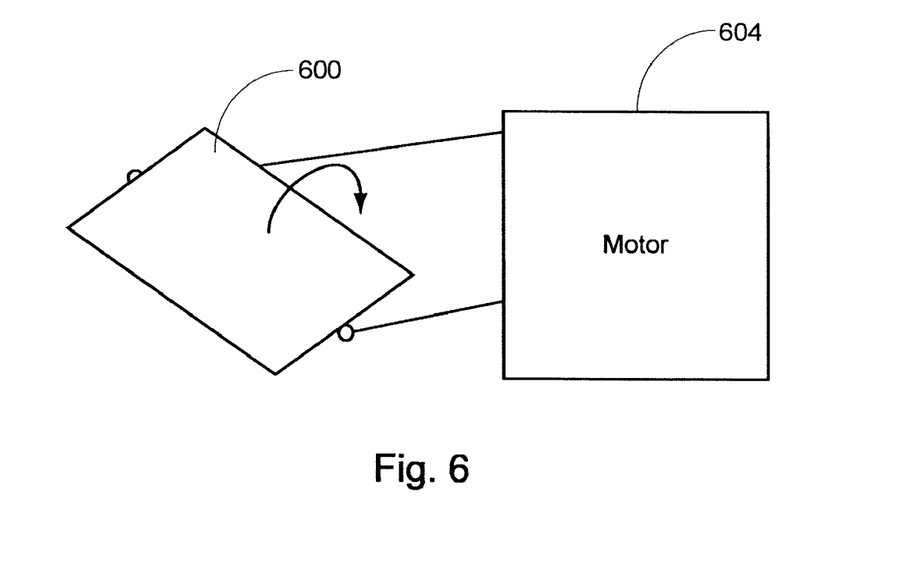
FIG. 6 is an alternate component of a tracking device.

FIG. 6 is an alternate exemplary deflector 600. In some devices, the deflector 600 may be a mirror that may be moved or rotated by a motor 604. The mirror may have a substantially rectangular shape, fan shape, or other shape. The motor 604 may be a step motor or other device that imparts motion or rotates the deflector 600 to direct an emitted signal, such as an IR beam or signal, in a desired direction. In some devices, the motor 604 may rotate the deflector 600 to allow for a deflected beam or signal to scan a vertical angular range, such as a range of substantially about 45 degrees.

Figure 7:
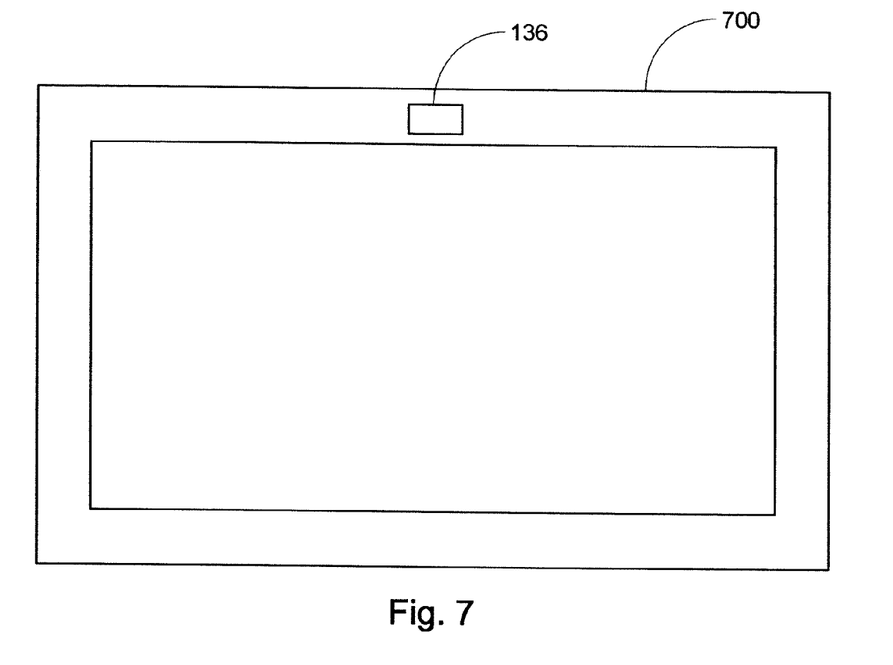
FIG. 7 is a front view of a device of a tracking system, such as the system of FIG. 1.

The deflector 420, 500, or 600 may deflect a signal, such as the signal 504, through an opening, such as the window 112 or the pass way 304. In FIG. 1, the deflected signal may be received by a receiving device 136 that may be part of or connected to device 132. The device 132 may be a display (700 of FIG. 7), computer screen, or other device part of an entertainment, audio, vehicle, and/or visual system. The device 132 may communicate with a tracking device or a device supporting the tracking device by a tangible or wired connection or a wireless connection. The receiving device 136 may be a sensor that provides a feedback signal in response to detection of the signal emitted from the tracking device. In some systems, the receiving device 136 may be a mirror that reflects all or a portion of the signal transmitted from the tracking device. The reflected portion may be detected by the tracking device through a transferable medium. In some systems, circuitry may detect the reflected portion and reset at an angle value to a predetermined value, as discussed above.

In operation, a user of a tracking device may place the tracking device, such as the tracking device 104 or 400, on his or her head to engage in a computer game, a virtual reality program, or audio and/or visual entertainment. Drift may accumulate regarding the tracking device, and when the user looks substantially straight ahead toward the receiving device, an angle value associated with tracking measurements may be automatically calibrated. In some systems, the tracking device may transmit a deflected signal, such as an IR signal that may or may not be encoded. The deflected signal may be within a vertical angular range of substantially about 45 degrees, and, therefore, the receiving device may detect the deflected signal when the head of the user is in appropriate orientation.

Figure 8:
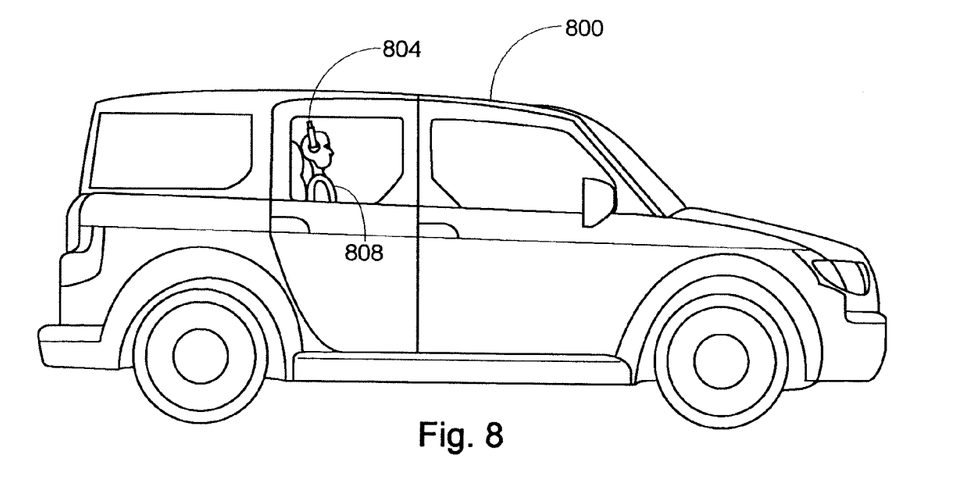
FIG. 8 illustrates a tracking system.

The tracking systems and/or devices described above may be implemented in different systems. FIG. 8 illustrates a tracking system in a vehicle 800. A user 808 may place a tracking device 804, such as the tracking device 104 or 400, on his or her head or another body part. In some systems, the tracking device 804 may be part of or may be a headphone.

Figure 9:
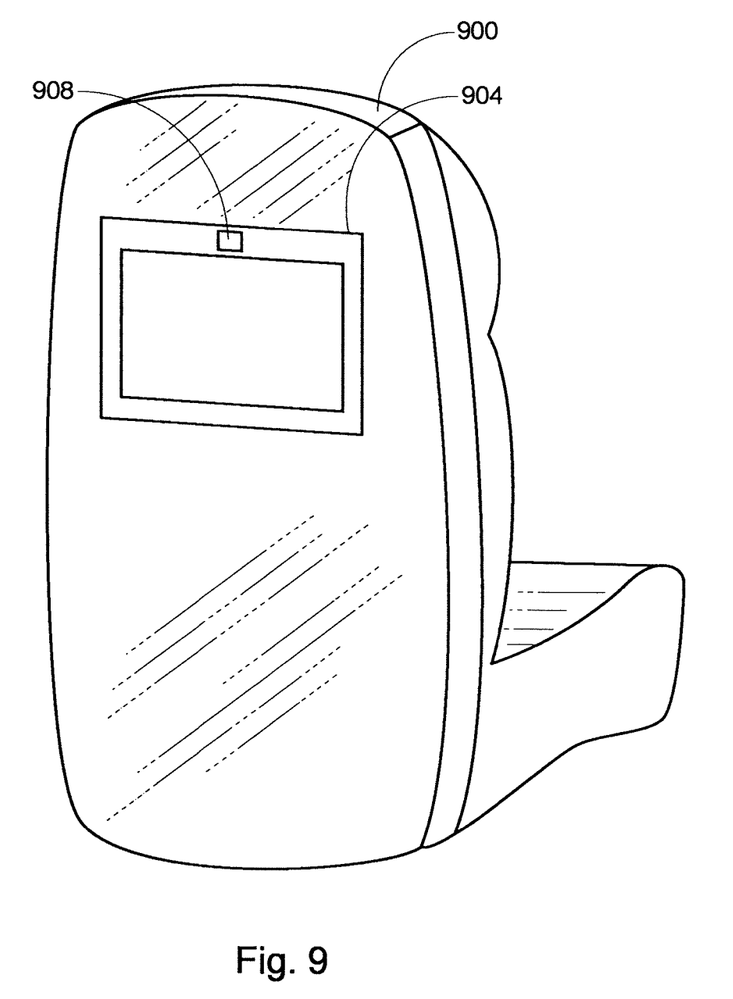
FIG. 9 illustrates a device of a tracking system.

FIG. 9 illustrates a device 904 that may be used in tracking system 100. The device 904 may be a display, computer screen, or other device located at a relatively fixed position in a vehicle. A receiving device 908 may be part of the device 904. In some systems, the device 904 may be arranged behind a portion of a seat 900. The device 904 may be positioned between seats, on the ceiling, or on a door of the vehicle. The device 904 may unfold or reposition itself from the ceiling or other part of the vehicle.

Figure 10:
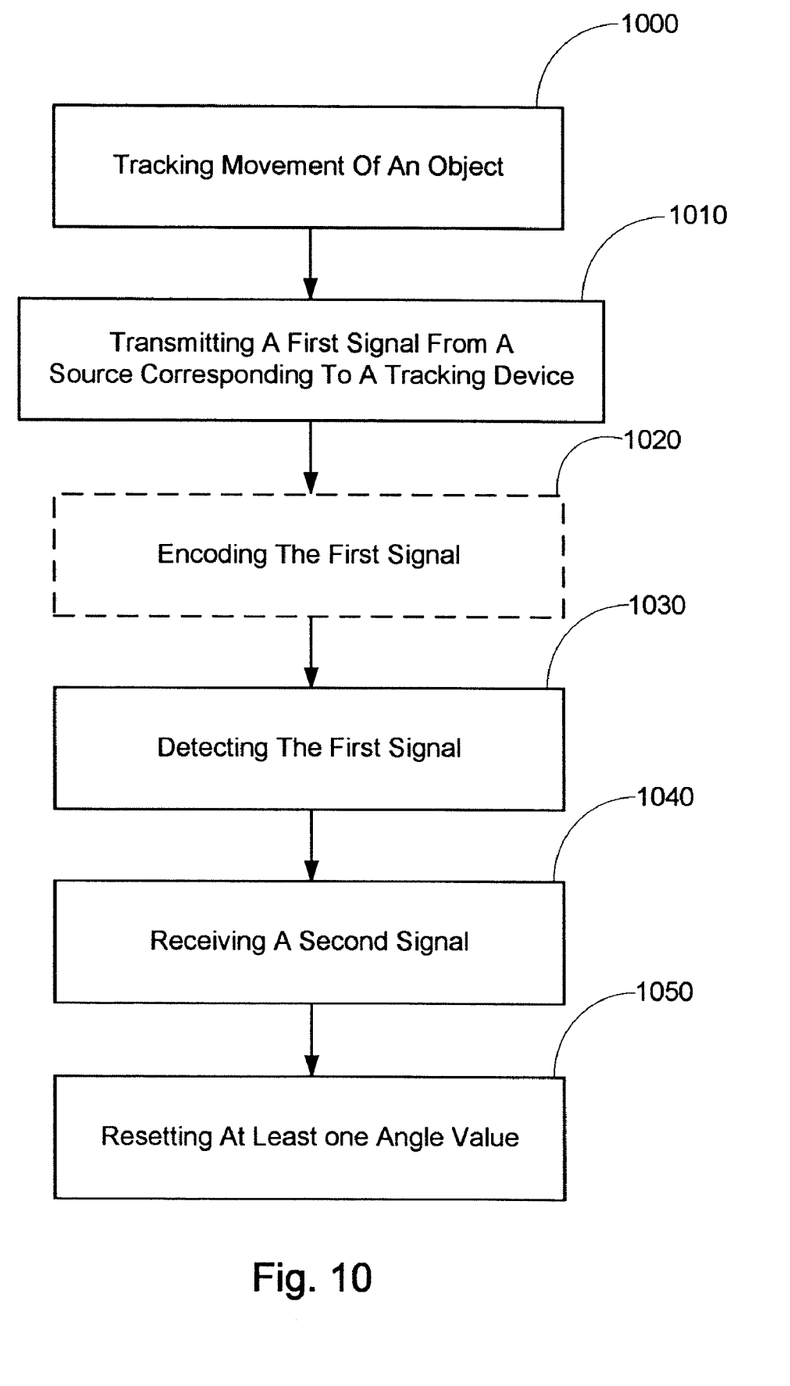
FIG. 10 is a flowchart illustrating a method for calibrating a tracking device.

FIG. 10 shows a method for calibrating a tracking device. At act 1000, movement of an object may be tracked, measured, or estimated. In some systems, a user may affix a tracking device on him or herself.

In act 1010, a first signal may be transmitted from a source to the tracking device. The first signal may be an IR, ultraviolet, or RF signal. In some processes, the source may be an IR emitter and may deflect an IR signal off a deflector of the tracking device. An optional process of encoding the first signal may occur, at act 1020.

At act 1030, the first signal, which may or may not be encoded, may be detected. A receiving process may detect the first signal. The position of a user or object and the receiving device may be such that when the first signal is detected, the object, such as a head of a user, may be considered to be in a starting or origin position. In some systems, when a user wearing the tracking device on his or her head looks substantially straight toward the display or the receiving device, the azimuth angle of the user's head may be considered to be zero or substantially zero because of the lack of rotation of the head from the left or the right.

At act 1040, a second signal may be received. The second signal may be received after the first signal is detected.

At act 1050, at least one angle value, such as an azimuth or azimuthal angle value, may be reset or calibrated to a predetermined value in response to the second signal. In some processes, when the second signal may be received by the tracking device, the position of the object, such as the head of a user, may be considered to be in an origin state or have an azimuth angle of substantially about zero. Therefore, circuitry of the tracking device, such as the circuitry 408, or any other circuitry may set the angle value to zero, about zero, or another predetermined value. Other movement, position, or angle values, such as roll or pitch values, may be reset based on the same or different positioning. By resetting the angle value, such as the azimuth angle value, the process may compensate for accumulated drift.

Figure 11:
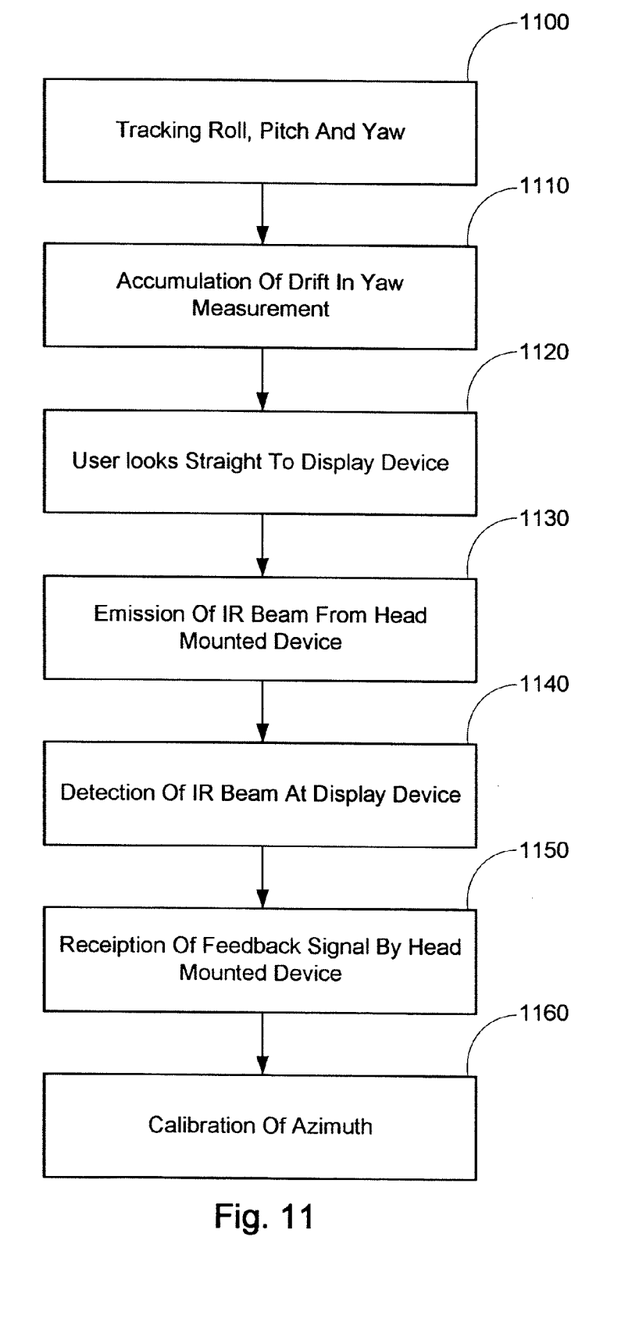
FIG. 11 is a flowchart illustrating another method for calibrating a tracking device.

FIG. 11 shows another method for calibrating a tracking device. At act 1100, a roll, pitch, or yaw (e.g., azimuth) angle or movement of a user or object may be tracked. Drift between measured and actual values may accumulate, such as for azimuth measurements, over time, at act 1110. At act 1120, a user or object may face a display device or other audio and/or visual device. In some processes, a user may look straight toward a display. A beam or signal, such as an IR beam, may be transmitted or emitted from a tracking device coupled to the user (e.g., a user's head) or object, at act 1130. At act 1140, the beam or signal may be sensed or detected by the display device or other device (e.g., when the user looks toward the display). At act 1150, a feedback signal may be transmitted to the tracking device in response to the detected beam or signal. An angle value or measurement, such as an azimuth angle value, may be calibrated in response to the feedback signal, at act 1160.

The logic, software or instructions for implementing the processes, methods and/or techniques discussed above may be stored on computer-readable storage media or memories or other tangible media, such as a cache, buffer, RAM, removable media, hard drive, other computer readable storage media, or any other tangible media. The tangible media may include volatile and nonvolatile storage media. The functions, acts or tasks illustrated in the figures or described may be executed in response to one or more sets of logic or instructions stored in or on computer readable storage media. The functions, acts or tasks may be independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In some systems, the instructions may be stored on a removable media device for reading by local or remote systems. In other systems, the logic or instructions may be stored in a remote location for transfer through a computer network or over telephone lines. In yet other systems, the logic or instructions may be stored within a given computer, central processing unit ("CPU"), graphics processing unit ("GPU") or system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for calibrating a tracking device, the method comprising:

transmitting a first signal from a source mounted in a tracking device, the tracking device mounted on an object positioned in front of a receiving device such that the tracking device and the receiving device are aligned at a desired predetermined angle value;

receiving a second signal as a function of a position of the tracking device, the second signal being received from the receiving device; and resetting at least one angle value maintained in circuitry in the tracking device to be the desired predetermined value as a function of the reception of the second signal, where the tracking device determines rotational movement of an object using a measurement device, and where the determination includes a rotational measurement used to determine the at least one angle value relative to the predetermined value when the object rotates to rotate the tracking device angularly from the alignment between the tracking device and receiving device.

2. The method of claim 1, the tracking device comprises an inertial head tracking device.

3. The method of claim 1, where transmitting the first signal comprises transmitting an infrared signal, an ultraviolet signal, or a radio frequency signal.

4. The method of claim 1, further comprising encoding the first signal.

5. The method of claim 1, where the receiving device comprises a display having a sensor that detects the first signal based on the position of the tracking device.

6. The method of claim 1, where the second signal comprises a feedback signal transmitted to the tracking device in response to detection of the first signal.

7. The method of claim 1, where the second signal comprises a reflected portion of the first signal.

8. The method of claim 1, where transmitting the first signal comprises deflecting the first signal within a predetermined angular range.

9. The method of claim 8, where deflecting the first signal comprises deflecting the first signal using a deflector supported by the tracking device.

10. The method of claim 9, where the deflector comprises a fan-shaped deflector or a movable mirror.

11. The method of claim 1, where resetting the at least one angle value comprises resetting an azimuthal angle value.

12. A tracking device for tracking rotational and translational movement of an object comprising:

a housing configured to support the tracking device on the object;

an emitter supported by the housing, the emitter configured to transmit a first signal when the object is positioned in front of a receiving device such that the tracking device and the receiving device are aligned at a desired predetermined angle value;

a measurement device within the housing, the measurement device configured to measure rotational movement of the object when the tracking device is mounted on the object; and circuitry in communication with the measurement device, the circuitry operative to receive a second signal from the receiving device in response to the first signal, where the circuitry is further operative to reset at least one angle value to the predetermined angle value as a function of the reception of the second signal, the at least one angle value determined by a measurement of the rotational movement of the object using the measurement device.

13. The tracking device of claim 12, where the housing comprises part of a headphone device.

14. The tracking device of claim 12, where the measurement device comprises an inertial measuring device operative to measure rotational movement of a head of a user.

15. The tracking device of claim 14, where the inertial measuring device comprises a gyroscope.

16. The tracking device of claim 12, further comprising an encoder in communication with the emitter, the encoder configured to encode the first signal.

17. The tracking device of claim 12, further comprising a deflector supported by the housing, the deflector configured to deflect the first signal within a predetermined angular range.

18. The tracing device of claim 17, where the deflector has a substantially fan shape.

19. The tracking device of claim 12, where the first signal comprises an infrared signal, an ultraviolet signal, or a radio frequency signal.

20. The tracing device of claim 12, where the second signal comprises a reflected portion of the first signal.

21. A tracking system with automatic calibration, the system comprising:

a tracking device configured to measure rotational movement of an object using a measurement device when the tracking device is mounted on the object, the tracking device further configured to transmit a first signal for calibration; and a receiving device separate from the tracking device and aligned with the tracking device at a desired predetermined angle value, the receiving device operable to detect the first signal and provide a second signal to the tracking device in response to the first signal, where the measured rotational movement is used to determine an at least one angle value relative to the desired predetermined value when the object rotates to rotate the tracking device angularly from an alignment between the tracking device and the receiving device, and where detection of the first signal is based on a position of the tracking device, and where the tracking device is operative to reset the at least one angle value to the desired predetermined value as a function of the reception of the second signal.

22. The tracking system of claim 21, where the object comprises a user, and where the tracking device is operative to be placed on a head of the user and measure rotation movement of the head of the user.

23. The tracking system of claim 21, where the receiving device comprises a unitary part of a display.

24. The tracking system of claim 23, where the display is located at a relatively fixed position within a vehicle.

* * * * *